June 13, 1950 H. S. MARMORSTEIN 2,511,071

CONTROL CIRCUIT FOR RADIO PHONOGRAPH COMBINATIONS

Filed March 19, 1946

INVENTOR
Henry S. Marmorstein
BY J. B. Feldkin
ATTORNEY

Patented June 13, 1950 2,511,071

UNITED STATES PATENT OFFICE 2,511,071

CONTROL CIRCUIT FOR RADIO PHONOGRAPH COMBINATIONS

Henry S. Marmorstein, Jersey City, N. J.

Application March 19, 1946, Serial No. 655,443

5 Claims. (Cl. 179—100.11)

This invention relates to combination radio receiver and phonograph. It particularly relates to device wherein the turntable for the phonograph is turned by an electric motor.

Such apparatus has heretofore been made to successively and automatically play a number of records and when the playing of the last record is completed, the circuit for the motor which operates the turntable is automatically opened to stop the motor. However, in such apparatus the circuit for the radio receiver and the radio amplifying circuit for the phonograph does not go "off." In accordance with the present invention, means is provided to turn "off" the power to the radio receiver as well as phonograph amplifier and motor, automatically when the last of the records on the record changer is finished playing. With such construction a user can put a number of records on the record changer, start the machine playing, sit down, and when the playing is complete, the entire radio shuts "off" and it is not necessary for the user to get up and shut "off" the radio.

Another object of this invention is to provide a device of the character described which shall be simple to construct, inexpensive to build and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Figure 1:
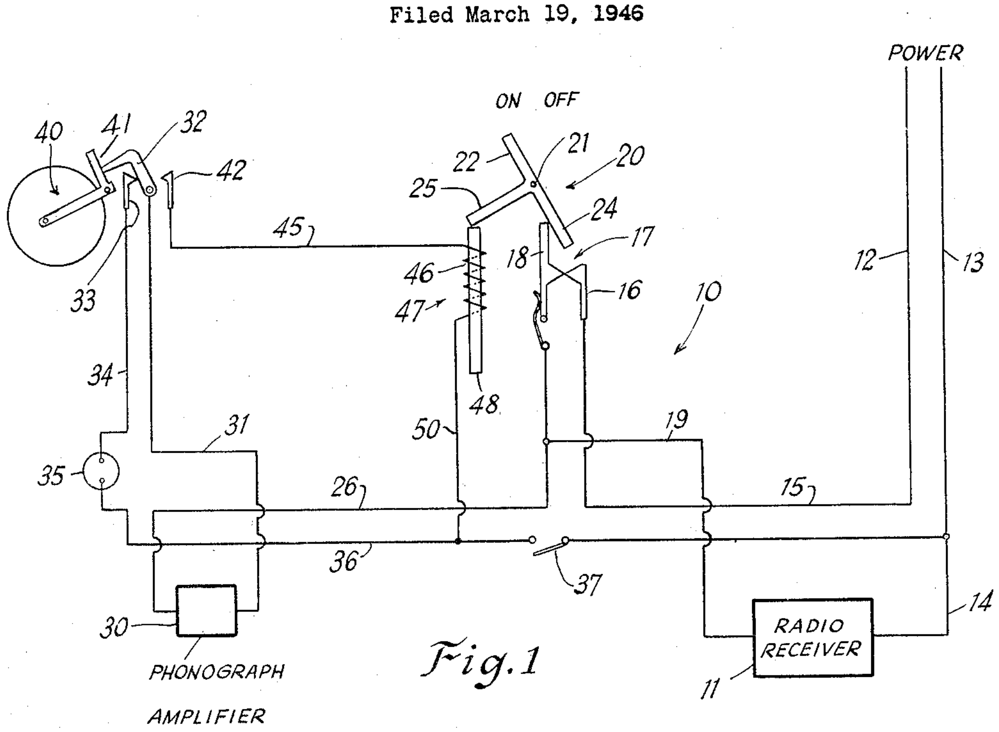
Figure 2:
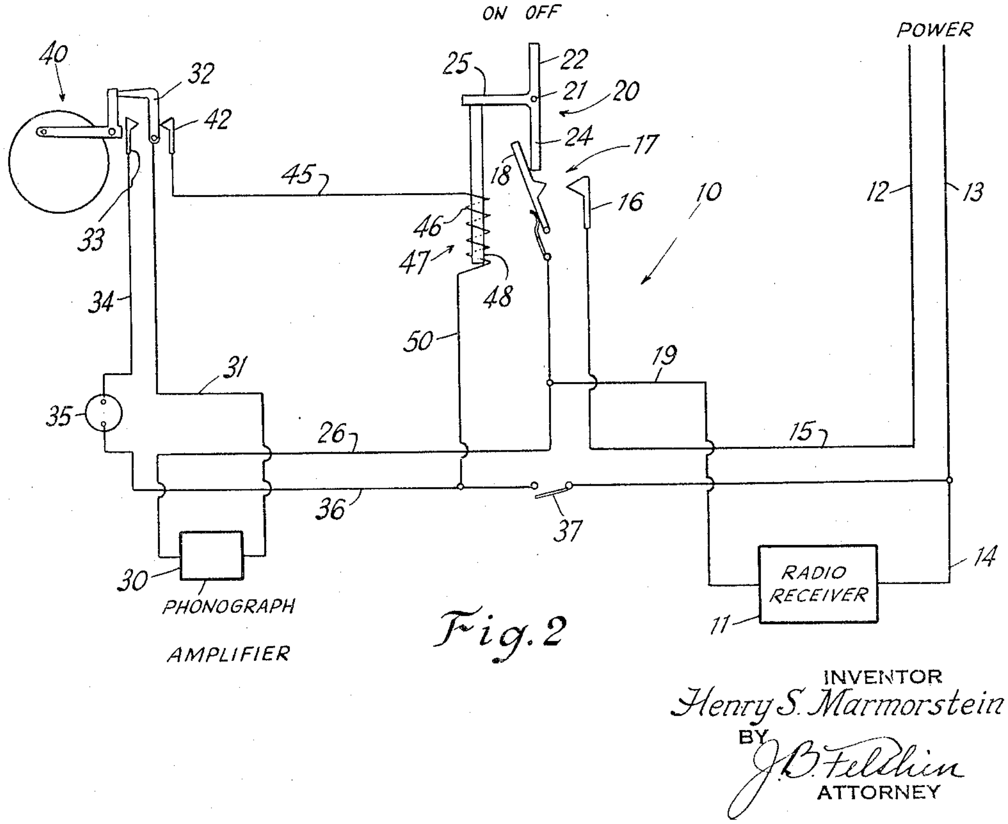

In the accompanying drawing, in which is shown various possible illustrative embodiments of this invention, Fig. 1 is a wiring diagram illustrating the invention; and Fig. 2 is a view similar to Fig. 1 but showing the circuit in "off" condition.

Referring now in detail to the drawing, 10 designates apparatus embodying the invention. Said apparatus comprises a radio receiver circuit 11 of any suitable type which includes usual audio stage and speaker. Power is supplied thereto from power lead lines 12, 13. Lead line 13 is connected by wire 14 to one terminal of the radio receiver 11. Lead line 12 is connected by wire 15 to a switch contact 16 of a normally closed switch 17. Engaging said contact 16 is a spring switch contact 18. Contact 18 is connected by wire 19 to the other terminal of the receiver circuit 11.

Switch 17 is controlled by a switch actuator 20 pivoted as at 21. Said actuator 20 has a handle 22 which may be moved from "on" to "off" position. Said actuator will remain in any position to which it is moved. When actuator 20 is in "on" position, switch 17 is closed. It is provided with an arm 24 adapted to push switch contact 18 away from contact 16 when it is moved to "off" position. Said actuator is also provided with an arm 25 for the purpose hereinafter appearing.

Wire 19 is connected by wire 26 to one terminal of phonograph amplifier circuit 30. The other side of said circuit 30 is connected by wire 31 to a switch arm 32. Said switch arm 32 is adapted to normally engage a switch contact 33 connected by wire 34 to one terminal of the motor 35 for turning the turntable of the phonograph whose amplifying circuit is designated by numeral 30.

The other terminal of motor 35 is connected by wire 36 to lead line 13. A manual switch 37 may be interposed in wire 36.

In the drawing, 40 designates the tone arm of the phonograph. It is provided with an arm 41 adapted, when playing of the record is completed, to move arm 32 off contact 33 and into engagement with a switch contact 42. Electronic phonographs with record changers are known in which the phonograph motor is switched "off" automatically when the last of a plurality of records is played.

Tone arm 40 may be equipped with means to move arm 32 out of contact with switch 33 and into engagement with contact 42 automatically when playing of the last of a series of records on the record changer is finished.

Contact 42 is connected by wire 45 to the coil 46 of a time delay solenoid 47. Said solenoid includes an armature 48. When coil 46 is energized, armature 48 moves up slowly. When coil 46 is deenergized, armature 48 moves down quickly. Coil 46 is connected by wire 50 to wire 36. When solenoid 47 is energized, armature moves up slowly and engages arm 25 to swing actuator 20 from the position of Fig. 1 to the position of Fig. 2, where arm 22 is in "off" position and switch 17 is open.

The operation of the apparatus will now be described. When radio receiver 11 is operating, switch 17 is closed and actuator 20 is in "on" position. Where arm 32 is in engagement with contact 33 the motor 35, and amplifier 30 are energized.

When the last record is finished playing, arm 32 moves away from contact 33 and into engagement with contact 42, thus breaking circuit for motor 35 and amplifier 30. At same time solenoid 47 is energized and armature 48 moves up to move actuator 20 to "off" position and switch 17 is opened to break the circuit for the receiver 11. At same time the solenoid circuit is also broken so that armature 48 moves down. Actuator 20 may be thereafter manually moved to "on" position whenever it is desired to energize the receiver circuit.

When tone arm 40 is moved to starting position, arm 32 moves into engagement with contact 33. The circuit for motor 35 and amplifier 30 is controlled by manual switch 37.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a radio receiver, a power circuit therefor, a switch in said circuit, a second power circuit including a phonograph amplifier and said first switch in series circuit, means in said second circuit to control the first switch, a second switch in said second circuit, a third power circuit including a phonograph motor and said amplifier and first switch in series circuit, a third switch in said third circuit in series with said amplifier, motor and first switch, a tone arm and means on said tone arm to control said second and third switches.

2. In combination, a radio receiver, a power circuit therefor, a normally closed switch in said circuit in series with said receiver, a second power circuit including a phonograph amplifier and a solenoid coil and said normally closed switch in series circuit, means controlled by energization of the solenoid coil to open said normally closed switch, a normally open switch in said second circuit, a tone arm, means controlled thereby to close said normally open switch of said second circuit, a third power circuit including a phonograph turntable motor and said amplifier and said normally closed switch in series circuit, a second normally closed switch in said third circuit, and means controlled by said tone arm to open the second normally closed switch of said third circuit and close the normally open switch of the second circuit.

3. In combination, a radio receiver, a power circuit therefor, a normally closed switch in said circuit in series with said receiver, a second power circuit including a phonograph amplifier and a solenoid coil and said normally closed switch in series circuit, means controlled by energization of the solenoid coil to open said normally closed switch, a normally open switch in said second circuit, a tone arm, means controlled thereby to close said normally open switch of said second circuit, a third power circuit including a phonograph turntable motor and said amplifier and said normally closed switch in series circuit, a second normally closed switch in said third circuit, and means controlled by said tone arm to open the second normally closed switch of said third circuit and close the normally open switch of the second circuit, said solenoid coil being slow to energize and quick to deenergize.

4. In combination, a phonograph comprising a turntable and a tone arm and a motor to turn the turntable, a radio receiver, a first power circuit including said radio receiver, a first switch in said first circuit in series with said radio receiver, means to bias said first switch to closed position, switch actuating means to open said first switch, a second power circuit, a solenoid including a solenoid coil in said second circuit, and an armature positioned to move said switch actuating means to open said first switch when said coil is energized, and said switch actuating means being adapted to remain in switch opening position when moved to such position, a phonograph radio amplifier for said tone arm in said second circuit in series with said coil, said first switch being in said second circuit in series with said coil and amplifier, a second switch in said second circuit in series with said coil, amplifier, and first switch, a third power circuit including said amplifier and motor and first switch in series, a third switch in said third circuit, and means on the tone arm to close the third switch and open the second switch while a record is being played on the turntable, and to open the third switch and close the second switch after completing play of said record.

5. In combination, a phonograph comprising a turntable, and a tone arm and a motor to turn the turntable, a radio receiver, a first power circuit including said radio receiver, a first switch in said first circuit in series with said radio receiver, means to bias said first switch to closed position, switch actuating means to open said first switch, a second power circuit, a solenoid including a solenoid coil in said second circuit, and an armature positioned to move said switch actuating means to open said first switch when said coil is energized, and said switch actuating means being adapted to remain in switch opening position when moved to such position, a phonograph radio amplifier for said tone arm in said second circuit in series with said coil, said first switch being in said second circuit in series with said coil and amplifier, a second switch in said second circuit in series with said coil, amplifier and first switch, a third power circuit including said amplifier and motor and first switch in series, a third switch in said third circuit in series with said amplifier motor and first switch, and means on the tone arm to close the third switch and open the second switch while a record is being played on the turntable, and to open the third switch and close the second switch after completing play of said record, and a manual switch in said second and third circuits to retain said second and third circuits open when said manual switch is open.

HENRY S. MARMORSTEIN.

REFERENCES CITED

The following references are of record in the file of this patent:

UNITED STATES PATENTS

| Number | Name | Date |
|---|---|---|
| 1,852,878 | Gardner | Apr. 5, 1932 |
| 1,969,344 | Andrews | Aug. 7, 1934 |